E. J. EDWARDS.
VEHICLE LAMP.
APPLICATION FILED MAR. 4, 1915.
1,214,524.
Patented Feb. 6, 1917.
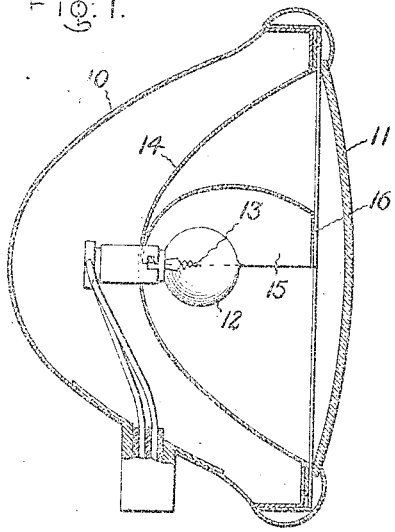
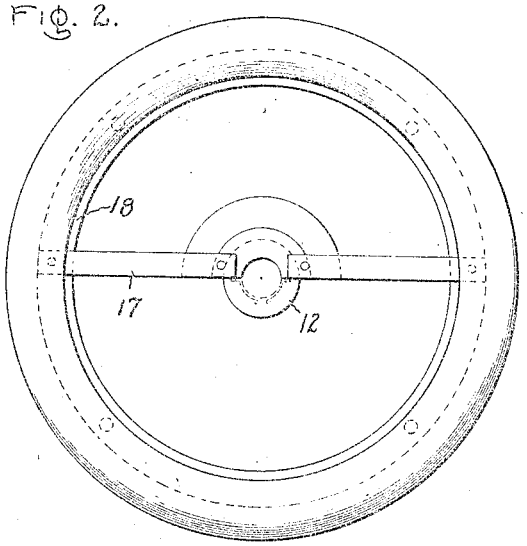
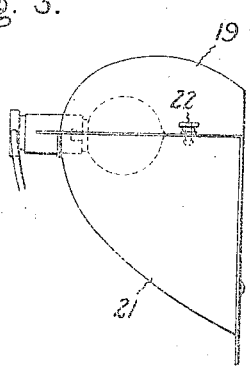
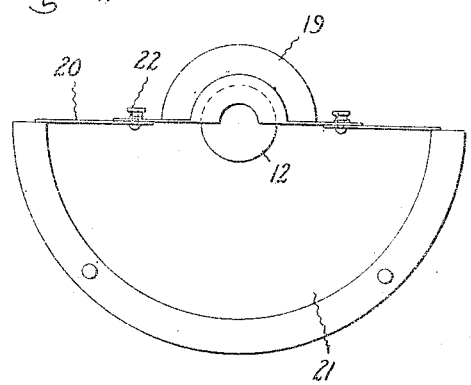
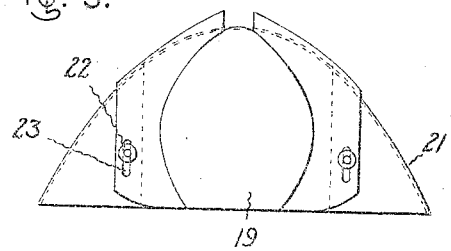
WITNESSES:
INVENTOR:
EVAN J. EDWARDS,
BY
HIS ATTORNEY.

UNITED STATES PATENT OFFICE.

EVAN J. EDWARDS, OF CLEVELAND, OHIO, ASSIGNOR TO GENERAL ELECTRIC COMPANY, A CORPORATION OF NEW YORK.

VEHICLE-LAMP.

1,214,524.

Specification of Letters Patent.

Patented Feb. 6, 1917.

Application filed March 4, 1915. Serial No. 12,149.

*To all whom it may concern:*

Be it known that I, EVAN J. EDWARDS, a citizen of the United States, residing in Cleveland, county of Cuyahoga, State of Ohio, have invented certain new and useful Improvements in Vehicle-Lamps, of which the following is a specification.

My invention relates to lamps for automobiles and other vehicles, and more particularly means whereby the glare from such lamps is substantially eliminated and at the same time the illuminating efficiency is increased.

According to regulations which are in force in a great many localities, it is necessary that the light shall not be transmitted from the lamp above the horizontal plane passing through the light source so that pedestrians and the occupants of other vehicles will not be inconvenienced by the glare. Various means have been proposed for accomplishing this purpose, but practically all of them have the disadvantage that while they meet the conditions imposed by the regulations to a certain extent, they do so at the expense of efficiency. According to my invention, means are provided for preventing the transmission of light above the horizontal and at the same time the light which would ordinarily be lost on this account is redirected so that it illuminates the road immediately in front of the vehicle, including the curbing, and thus enables the driver to better guide the vehicle.

My invention will be more clearly understood by referring to the accompanying drawing, in which two forms of apparatus are shown embodying my invention. However, it is to be understood that these are merely illustrative.

Figure 1 is a vertical section of one of these forms, and Fig. 2 is a front elevation of the same. Fig. 3 is a diagrammatic side elevation; Fig. 4 a diagrammatic front elevation, and Fig. 5 a diagrammatic plan of the reflector and screen portion of the other form embodying my invention.

Referring to Figs. 1 and 2, 10 is the casing of an automobile lamp of the electric type. This lamp comprises also the lens 11 mounted in the front thereof.

12 is an electric incandescent lamp having a preferably concentrated filament 13, which constitutes the light source. Mounted immediately back of the said lamp is the reflector 14, which is preferably parabolic. In Fig. 1 the parabola shown is a vertical section of a paraboloid, but the effective portion of the paraboloid is that part of its shell which extends below the horizontal axial plane of segmentation, the portion extending above the horizontal plane being shown in Fig. 1 only for the purpose of indicating how the invention may be adapted to existing headlights which are usually provided with parabolic reflectors.

Mounted over the light source and having its sides preferably extending substantially down to the horizontal plane including said light source is the device 15 which constitutes the salient feature of my invention. This device has substantially the form of the half of an ellipsoid of revolution, and since it extends down to the horizontal plane including the light source, no direct rays from the latter can go out into the field above the horizon. Here again Fig. 1 shows a vertical section, namely, a vertical axial section of an ellipsoid of revolution, but the device as used is the shell or the greater part of the shell of the half of an ellipsoid which extends above the horizontal plane of segmentation, passing through the major axis; the ellipsoid itself being a prolate ellipsoid, that is to say, one that is generated by an ellipse rotating about its major axis. In the particular embodiment illustrated the device is flattened at its front end 16 for convenience in mounting. As shown in Fig. 2, the device 15 may be mounted, as by means of straps 17, to the rim 18, to which is also attached the parabolic reflector 14. The disposition of the described parts is preferably such that the light source, filament 13, is disposed at one of the foci of the half ellipsoid formed by a longitudinal axial horizontal section of the part 15. The construction should be such that the other focus is located near the flattened end portion 16.

The function of the above described disposition of parts will be that the light transmitted from the light source, which is located at one focus of the ellipse, in planes above the horizontal will be redirected by the reflector 15 through the other focus. This light will all be directed downwardly so as to illuminate the road at points near the front of the vehicle where the lamp is mounted. At the same time this light will spread out over a considerable area, thus enabling the driver to see the curb and assisting him in guiding the vehicle.

The position of the parabolic reflector 14 relative to the light source is preferably such that the latter will be slightly in back of the focus of the paraboloid. This locates the focus of the paraboloid between the foci of the ellipsoid but rather close to one of them and this causes all light transmitted downwardly from the light source to be redirected slightly downwardly by the parabolic reflector, thus removing any doubt as to compliance with the regulations hereinbefore referred to.

In Figs. 3, 4 and 5 a modification is shown, in which ellipsoidal reflector shell 19 is fastened to the horizontally extending plate 20 forming a cover for the semi-parabolic reflector 21. As shown in Fig. 5, the provision of the fastenings 22 with slots 23 allows the adjustment of the reflector shell 19 with reference to the semi-parabolic reflector 21, and therefore with respect to the light source.

It will be seen from the foregoing that in both forms of the reflector here shown the axes and the section planes of the ellipsoidal and paraboloidal portions coincide, the ellipsoidal part extending on one side and the paraboloidal part on the other side of the common section plane. The upper part of the reflector, therefore, presents a surface which is the segment of the surface of a prolate ellipsoid of revolution cut off by a horizontal plane through its major axis, while the lower part of the reflector presents a surface which is the segment of the surface of a paraboloid cut off by a horizontal plane through its axis.

Various modifications of the above described device will readily occur to those skilled in the art and are to be considered as coming within the scope of my invention, which is set forth in the following claims.

What I claim as new and desire to secure by Letters Patent of the United States, is:—

1. A reflector for a vehicle lamp comprising a shell of a segment of the surface of a prolate ellipsoid of revolution by a plane of segmentation through the major axis and the shell of an axial segment of the surface of a paraboloid, the axes and planes of segmentation coinciding, the focus of the paraboloid being between the foci of the ellipsoid and one of the shells extending on one side and the other on the opposite side of the common plane of segmentation.

2. In a vehicle lamp, the combination of the shell of a segment of the surface of a prolate ellipsoid of revolution delimited by a substantially horizontal plane of segmentation through the major axis and the shell of an axial segment of the surface of a paraboloid, the axes and planes of segmentation coinciding, the ellipsoidal shell extending above and the paraboloidal shell below the common plane of segmentation, with a concentrated source of light substantially in one of the foci of the ellipsoid and in the rear of the focus of the paraboloid.

In witness whereof, I have hereunto set my hand this 2nd day of March, 1915.

EVAN J. EDWARDS.

Witnesses:
W. L. KUBACH,
CHESTER L. DOWS.